(12) United States Patent
Starodubov et al.

(10) Patent No.: US 7,580,600 B1
(45) Date of Patent: Aug. 25, 2009

(54) FREE SPACE HIGH POWER FIBER COUPLER

(75) Inventors: Dmitry Starodubov, Dudley, MA (US); Alex Yusim, Boston, MA (US)

(73) Assignee: IPG Photonics Corporation, Oxford, MA (US)

( * ) Notice: Subject to any disclaimer, the term of this patent is extended or adjusted under 35 U.S.C. 154(b) by 0 days.

(21) Appl. No.: 12/369,686

(22) Filed: Feb. 11, 2009

(51) Int. Cl.
  *G02B 6/42* (2006.01)
(52) U.S. Cl. .......................... 385/31; 385/29; 385/124; 385/127; 385/128; 385/140
(58) Field of Classification Search .................... 385/14, 385/15, 31, 33, 34, 42, 43, 44, 45, 127, 128, 385/140, 27, 28, 123, 124, 95, 96, 97, 98, 385/99, 29
See application file for complete search history.

(56) References Cited

U.S. PATENT DOCUMENTS

| | | | | |
|---|---|---|---|---|
| 4,958,897 A | * | 9/1990 | Yanagawa et al. | 385/50 |
| 5,867,513 A | * | 2/1999 | Sato | 372/32 |
| 5,930,423 A | * | 7/1999 | Chen et al. | 385/49 |
| 6,487,338 B2 | * | 11/2002 | Asawa et al. | 385/29 |
| 7,349,596 B2 | * | 3/2008 | Anderegg et al. | 385/29 |
| 2002/0126954 A1 | * | 9/2002 | Aswawa et al. | 385/28 |
| 2007/0217738 A1 | * | 9/2007 | Anderegg et al. | 385/29 |

* cited by examiner

*Primary Examiner*—Brian M Healy
(74) *Attorney, Agent, or Firm*—Y. Kateshov

(57) ABSTRACT

A waveguide receiving light which propagates through free space is configured with a coupler and delivery fiber. The coupler, including a GREEN or multimode fiber, has a protective coating and so does the delivery fiber. Upon splicing of the coupler to the delivery fiber, the protective coatings of the respective coupler and delivery fiber are spaced apart exposing thus end regions of the respective coupler and fiber. The exposed regions are covered by a light stripper made of material having a refractive index which is substantially the same as or greater than that one of outer claddings. Accordingly, the light stripper minimizes the amount of light capable of coupling into the protective coatings of the respective delivery and coupler fibers enhancing thus a power handling capabilities of the waveguide.

20 Claims, 3 Drawing Sheets

FREE SPACE HIGH POWER FIBER COUPLER

BACKGROUND OF THE DISCLOSURE

1. Field of the Disclosure

The present disclosure relates generally to an optical system with a radiation source component and receiving fiber component separated from one another by free space. More specifically, the disclosure relates to free space high power coupler with a protective mechanism that greatly increases the damage threshold of the overall assembly.

2. Prior Art

In the prior art, relatively low powered lasers, such as those employed in optical communication or the like, emit a relatively low power radiation that is coupled into the core of an optical fiber using a lens. Certain applications require free-space propagation of radiation which then is coupled into a waveguide. Such a coupling, however, may be associated with certain difficulties, as explained immediately below.

FIG. 1 illustrates a laser system 10 configured with a source of radiation 12 emitting light along a light path. The radiation is coupled into a bulk optics 14 which focuses the received light so that it enters a core 20 of delivery fiber 16.

Even if delivery fiber 16 is a single mode standard waveguide, not all light from bulk optics 14 is coupled into a core 20 of fiber 16. A portion of light is typically guided in a cladding 28 which is highly optically-transmissive, i.e., only a small portion of light, if at all, is absorbed. The component absorbing the light is coating or adhesive 26.

Once high power light in the order of a watt or higher is coupled into delivery fiber 16 and transmitted through cladding 28 to coating 26, high temperatures, which inevitably accompany the absorption by the coating, may detrimentally affect the latter that, as well known, has a relatively low optical damage threshold. The coating 26 is used for protecting glass fibers from a mechanical damage and provides delivery fiber 16 with the desired degree of ruggedness. Hence, if coating 26 is damaged by elevated temperatures, the glass—material of fiber 16—can be irreparably damaged as well. Thus, typically, coating 26 is rather the limiting factors for the maximum power handling of system 10.

Still a further undesirable consequence of the elevated temperatures is associated with a volume of material 24 configured to couple delivery fiber 16 to a mount 22 during assembly of system 10 and selected from the group consisting of adhesives, epoxy and a combination thereof. Typically, material 24 has an optical damage threshold lower than the fiber coating. Should the energy of light portion, propagating in cladding 28 of delivery fiber 16, couple first into cladding 28, which has a high coefficient of heat conduction, into volume of material 24, the latter tends to melt. As a consequence, the coupling between mount 22 and delivery fiber 16 deteriorate. A further undesirable consequence of the melted adhesive is that it may migrate to the ends of the optical fiber and absorb radiant energy from the light source, resulting in local hot spots that can damage the optical fibers. As a result, adhesive/epoxy 24, like protective coating 26, may be the factor limiting the power requirements applied to modern fiber laser system.

A need, therefore, exists for an optical system configured to reliably operate at high power levels.

A further need exists for an optical system configured with a fiber receiving unit which has a structure that does not substantially limit the power handling capabilities of the fiber laser system.

Still another need exists for a rugged fiber receiving unit configured to receive and guide high power radiation, which is received through free space, without substantial power losses.

Still a further need exists for a rugged fiber receiving unit configured to minimize thermally induced structural damages by high power radiation to its components.

SUMMARY OF THE DISCLOSURE

These needs are met by a high power optical system configured with the disclosed fiber receiving unit which is operative to handle high powers without substantial power losses and excessive damages to the structure of the delivery fiber. Furthermore, in operation, the receiving unit configured from multiple components, as discussed below, is reliably aligned and supported by a mount, which makes the system rugged.

One of many salient features of the disclosure of the disclosed receiving unit includes a length of fiber spliced to a delivery fiber and, upon receiving light which propagates through free space, further coupling the received light into the delivery fiber. Hence, the length of fiber is further referred to as a coupler. The coupler adds necessary ruggedness to the entire receiving unit and improves coupling of light into the delivery fiber. Either GRIN fiber or multiclad fiber is used for configuring the coupler. Both these configurations are substantially different from a typical step-index fiber.

The disclosed coupler adds to the desired structural integrity of the overall system. Furthermore, the power losses, which necessarily accompany the coupling of light into a waveguide, are substantially minimized due to the known structural specifics of GRIN and multiclad fibers, as readily realized by one of ordinary skills in the fiber laser art. This is particularly important for high power optical systems operative to radiate a high quality beam with limited divergence in the far field, i.e., single or substantially single mode light.

As well known to the artisan, GRIN and multiclad configurations are structured to confine light in the core, if the GRIN fiber is used, or in the inner cladding, if the multiclad fiber is utilized. Thus, common to both of the above-mentioned configurations, only a small portion of core-guided light traverses the outer cladding. The energy of the small portion of light is insignificant and, thus, cannot detrimentally affect the protective coating. As a consequence, temperatures hazardous to the cladding/outer cladding are unlikely achievable even if the overall system operates at power levels substantially higher than those of the prior art.

Still another salient feature relates to a component including a volume of material which is operative to simultaneously perform various functions. In accordance with one aspect of this feature, the volume of material is configured to strip a portion of light propagating through the splice between the coupler and delivery fiber before it reaches the protective coating of the delivery fiber. As a consequence, the most vulnerable element of the fiber is reliably protected from a thermal impact which typically damages it.

Still a further feature is associated with the coupling of light into the input end of the coupler. Not all light propagating through free space is coupled into the core and inner cladding of the respective GRIN and multiclad fibers. Some of the received light end up in outer claddings and tend to couple into the protective coating. To minimize the amount of light absorbed by the coating of the coupler, a further volume of material with the refraction index lower than that one of the cladding is deposited over at least a part of the coupler. Such a configuration reflects at least a portion of light, which otherwise would couple out of the cladding, and, therefore, redirects most of the stray light towards the core. Furthermore, the volume of material, (referred hereinafter to as a light reflector), couples the coupler to a mount, which renders the coupler and, therefore, delivery fiber reliably aligned with one another.

BRIEF DESCRIPTION OF THE DRAWINGS

The above and other features will become more readily apparent from a specific description accompanied by the following drawings, in which.

SPECIFIC DESCRIPTION

Figure 1:
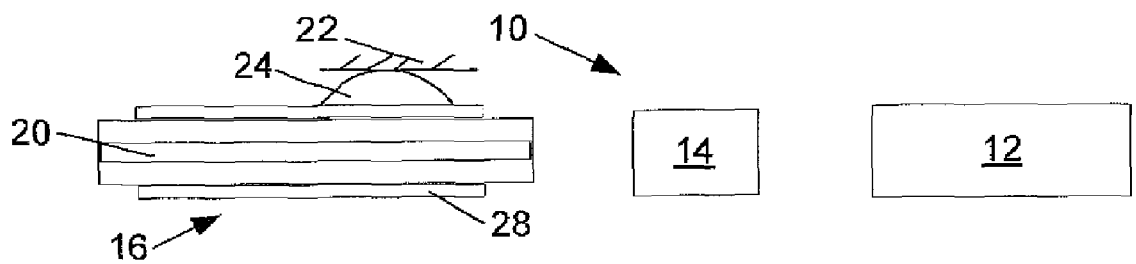
FIG. 1 is an optical schematics of fiber optical system generally representing the known prior art.

Reference will now be made in detail to several embodiments of the disclosure that are illustrated in the accompanying drawings. Wherever possible, same or similar reference numerals are used in the drawings and the description to refer to the same or like parts or steps. The drawings are in simplified form and are not to precise scale. The word "couple" and similar terms do not necessarily denote direct and immediate connections, but also include connections through intermediate elements or devices.

The disclosed modular high power optical system is configured with a fiber receiving component which has a fiber coupler that allows the system to exhibit an increased optical power damage threshold as compared to the prior art. Generally, the coupler of the present disclosure is configured as a graded index (GRIN) fiber or multiclad clad fiber operating in a manner that resolves the prior art issue of the low damage threshold of the fiber coating and the epoxy/adhesive and relatively simple misalignment of fiber components.

Figure 2:
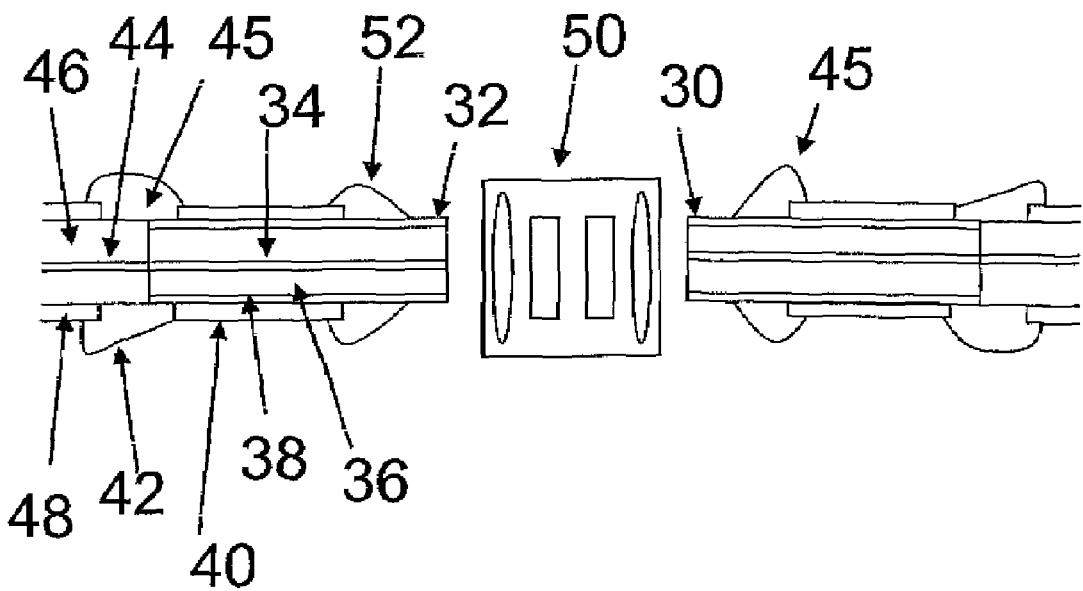
FIG. 2 is an optical schematics of one embodiment of the disclosed high power optical system configured with a receiving fiber component which includes a GRIN fiber operating as the coupler.

FIG. 2 illustrates an optical system 25 configured in accordance with the disclosure and including a launching component 30 which launches radiation propagating through free space such that light is incident upon a fiber receiving component. The receiving component is configured with, among others, a coupler 32, delivery fiber 42 and first volume of material 45.

The coupler 32 of FIG. 2 has a multiclad fiber configuration with concentrically positioned core 34, inner cladding 36 and outer cladding 38 which has a refractive index lower than that one of inner cladding 36. Such a configuration, as known to the artisan, is structured so that a major portion of light is coupled into core 34, while a minor portion is guided by inner cladding 36. Stray light may be enter outer cladding 38, but because of the lower index of refraction thereof relative to that one of inner cladding 36, the stray light is reflected into inner cladding 36 and has only an insignificant part supported by outer cladding 38. Accordingly, while the majority of light is guided in core 34, there is still light in the claddings which may pose a problem down the light path. The light coupled into the claddings may be particularly troubling in fiber systems configured to radiate a single mode light, although the disclosed system can operate in a multimode mode as well.

The core 34 of coupler 32 of FIG. 2 is configured to support a fundamental (single) mode at the desired wavelength. When fiber system 25 is concerned with a high quality beam having substantially a Gaussian shape, delivery fiber 42 is configured as a single mode fiber. In other words, cores 34 and 44 of the respective coupler and delivery fibers are mode matched to provide for substantially power lossless coupling. The mode matching is important but not the only factor affecting the lossless coupling. The alignment between cores 34 and 44 is important as well; otherwise, part of light guided in core 34 of coupler 32 would couple into a cladding 46 of delivery fiber 42, which is highly undesirable because of the power loss, as well as damage to the protective coating of delivery fiber 42, as explained below.

As disclosed above, in the known systems, using a receiving waveguide component which includes only a standard delivery fiber, a substantial portion of light is transmitted though the cladding and further into the protective coating which leads to elevated temperatures. The elevated temperatures tend to damage both the protective coating of this fiber and the fiber itself. The coupler 32 of the present disclosure minimizes the thermal damage to the delivery fiber observed in the known systems.

As illustrated in FIG. 2, volume of material 45 extends axially between protective coatings 40 and 48 of respective coupler 32 and delivery fiber 42 and, thus, over the splice region between these fibers. The protective coating 40 terminates at a distance from the output end of coupler 32, whereas coating 48 does not reach the input ends of delivery fiber 42. Hence the coatings 40 and 48 are spaced apart defining therebetween a transition region. The volume of material 45 preferably overlaps coating 40 and 48, but may terminate next to the opposing ends of the respective coatings.

Furthermore, volume of material 45 is configured to strip at least most of the light strayed into the transition region between protective coatings 40, 48. This is particularly advantageous in light of the low damage threshold of the protective coating and single mode-operated high power fiber systems. When the light, propagating within the transition region including portions of claddings 36, 38 and 46 of the respective coupler and delivery fiber, reaches protective coating 48 of delivery fiber 42, some of light energy will be lost and the possibility of damaging protective coating 48 is minimized.

Structurally, volume of material 45 includes, for example, silicone or other suitable materials with a refractive index which is at least substantially the same as or, preferably, somewhat greater than the index of adjacent claddings of the respective coupler and delivery fiber. As readily understood by the artisan, light propagates from a medium with a lower index to an adjacent medium with a higher index. Configuring volume of material 45, which is further referred to as a light stripper, with a high index of refraction relative to that one of the cladding minimizes the potential damage to protective coating 48 of delivery fiber 42.

The light stripper 45 is configured so that the refractive index thereof decreases with increasing temperature and absorbs power somewhat at a desired or range of wavelengths. When light stripper 45 absorbs power at a given wavelength propagating through claddings 36 of delivery fiber 42, the temperature of such material increases as power is dumped into the stripper. Consequently, the refractive index of stripper 45. decreases as a function of increasing temperature, as occur when power is absorbed by the light stripper.

The material of light stripper 45 may substantially match the refractive index of cladding 46 and outer cladding 38 of coupler 32, or, preferably, be somewhat higher than the latter. At the predetermined temperature, the refractive index of light stripper 45 drops below the refractive index of the claddings. When this happens, a corresponding increase in total internal reflection (TIR) of light within the cladding occurs. The increase in TIR within the cladding increases the amount of cladding guided light. Thus, when the temperature of a localized region of light stripper 45 exceeds the predetermined temperature, the maximum amount of light within this localized region is stripped, while the remaining light continues to propagated further along the light path. Such a stripping is a continuous self-sustained process along the entire length of stripper 45. Accordingly, knowing the wavelength and temperature, the desired length of stripper 45 may be determined so that all of the cladding-guided light will be stripped before it reaches coating 48 of delivery fiber 42. Knowing the wavelength and temperature, it is possible to form a varying index of refraction of light stripper 45. The varying index would allow the remote regions of stripper 45, which are located upstream from protective coating 48 of delivery fiber 42, strip more light and, thus, leave less energy of the remaining light that can be stripped by the regions of stripper 45 located closer to coating 48. Accordingly, the damage to coating 48 can be minimized even more than when the refractive index of stripper 45 is uniform.

Alternatively, light stripper 45 may be configured from materials, such as polymer acrylates, whose index of refraction increases with elevated temperatures. The mechanism of the stripper's operation, however, remains the same. The stray light, propagating from the medium with a relatively low index to the medium with a relatively high index, ends up in stripper 45.

In accordance with a further aspect of the disclosure, coupler 32 is configured to receive light propagating through free space with minimal losses. This is attained by configuring coupler 32 with another volume of material or light reflector 52 which is located close to but still at a distance from the input end of coupler 32. The volume of reflector 52 is selected with an index of refraction which is lower than that one of outer cladding 38. Without light reflector 52 light may exit coupler 32 which translates into the power loss. Furthermore, to even further improve the stability of the receiving component when the fiber system is in use, reflector 52 may also function as a fastener coupling coupler 32 to a mount in addition to light stripper 45. As a result, reflector 52 adds structural integrity to the coupler/delivery fiber components by fixing the coupler in the desired positions and, thus, reducing the possibility of misalignment of the spliced coupler and delivery fiber. Since protective coating 40 of coupler 32 may terminate either in the plane of the input end of the coupler or at a distance therefrom, light reflector may be in contact with coating 40 or cladding 34.

The light stripper 45, of course, may operate in the above-disclosed manner in case of back reflection, which may be very powerful in light of high powers at which the disclosed system operates. Moreover, the analogous configuration of light stripper 45 may be installed at a distance from the output end of launching component 30 which may include, among others, fibers. Having light stripper 45 provided on launching component 30 allows for minimizing the detrimental effect of light reflected, for example, from a bulk optics 50 or the input end of the receiving component or, of course, from the surface to be treated by the output of system 25. Besides, system 25 shown in FIG. 2 may be symmetrical, i.e. source of radiation 30 may be configured identically to the light receiving waveguide with the functions of these components reversed.

Figure 3:
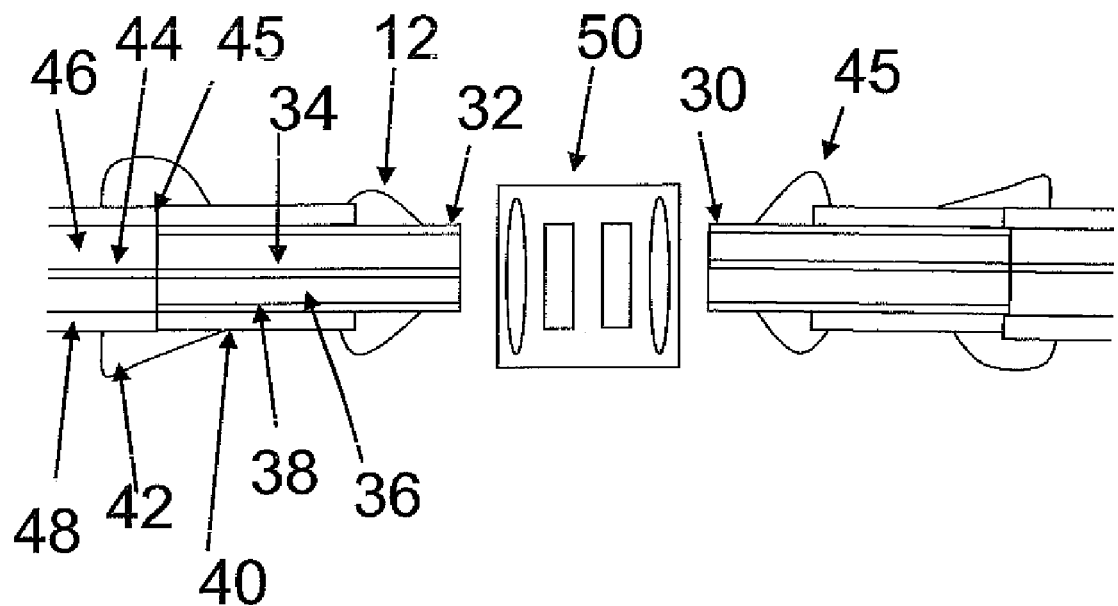
FIG. 3 is an optical schematics of a modified high power optical system of FIG. 2

FIG. 3 illustrates a slightly modified optical system of FIG. 2. In particular, protective coating 40 coupler 32 terminates at the input end of the latter. The light reflector 52, thus, extends of a portion of coating 40. However, the functionality of reflector 52 remains the same and includes preventing the decoupling of light received through free space and ensuring the reliable attachment of the receiving component to a mount. Note that although a bulk optics component is not illustrated, in reality, this configuration requires it for satisfactory coupling of light into the input end of coupler 32.

Figure 4:
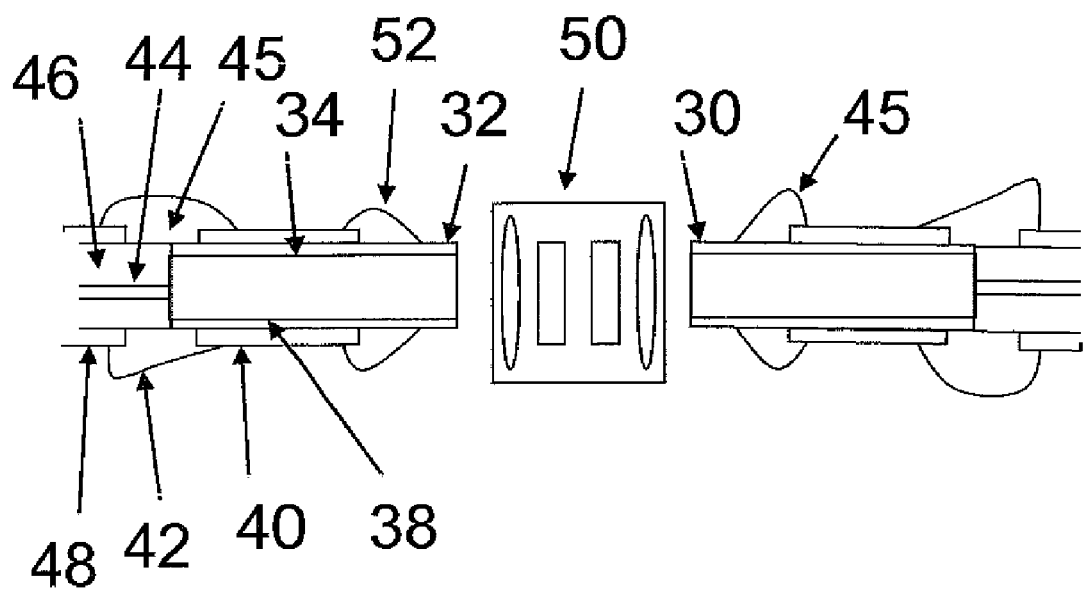
FIG. 4 is an optical schematics of a further embodiment of the disclosed high power optical system configured with a receiving fiber component which includes a multiclad fiber operating as the coupler.

FIG. 4 illustrates a further configuration of the high power fiber optical system of the present disclosure. The particularity of this system includes a different structure of coupler 32, with the rest of the structure being analogous to that one of FIG. 2.

The coupler 32 of FIG. 4 is configured as a GRIN fiber. The GRIN fiber includes multimode core 34, cladding layer 38 and coating 40. The light propagating through free space mostly couples into large core 34. The insignificant part may enter cladding 38. As readily realized by the artisan, while light propagates along core 34 of GRIN fiber coupler 32, the mode field periodically changes from small to large to small again and so on. The broadest region and narrowest region or waist correspond to respective planar wavefronts representing the largest and smallest mode field diameters, respectively. The planar wavefronts, as known, are best suited for fusion spicing with other fibers including delivery fiber 42.

Particularly in single mode-configured fiber systems, to prevent power loss during the propagation of light into core 44 of delivery fiber 42, it is highly advantageous to have cores 34 and 44 of respective coupler 32 and delivery fiber 42 mode matched. Accordingly, the length of GRIN fiber coupler 32 should be selected so that the broadest region would have substantially the same mode field as core 44 of fiber 42. This can be attained by determining the distance between the planar fronts, which in turn, can be determined based on the square-law analysis well known to one of ordinary skills.

However, similar to system 25 illustrated in FIGS. 2 and 3, some light is lost and, thus, traverses cladding 46 of delivery fiber 42 damaging coating 48. The light stripper 45, as discussed in detail above, minimizes the detrimental effect of the stray light.

Figure 5:
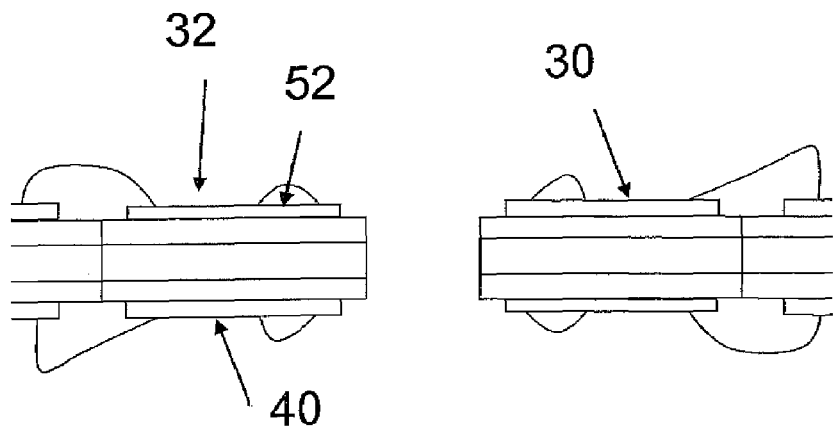
FIG. 5 is an optical schematics of the exemplary application of the disclosed receiving component.

FIG. 5 illustrates still a further modification of the disclosed system of FIGS. 2-4. Similar to FIG. 4, coupler 32 is configured from a GRIN fiber. However, in contrast to FIGS. 2, 3 and 4, the illustrated system does not have a bulk optics component. Preferably, but not necessarily, both the launching and receiving components utilize the GRIN fiber as a coupler 32.

The GRIN fiber is particularly suitable for shaping a free-space propagating beam with a waist. This, as one of ordinary skills readily realizes, leads to a reliable coupling of the free-space propagating beam into the input end of the coupler.

Still another advantage of the system of FIG. 5 is that an air gap prevents fiber fuse phenomenon. The latter detrimentally affects the operation of any optical system. Additionally, a bulk head adaptor may be used in the system of FIG. 5. Such a configuration improves alignment between the launching and receiving components.

Figure 6:
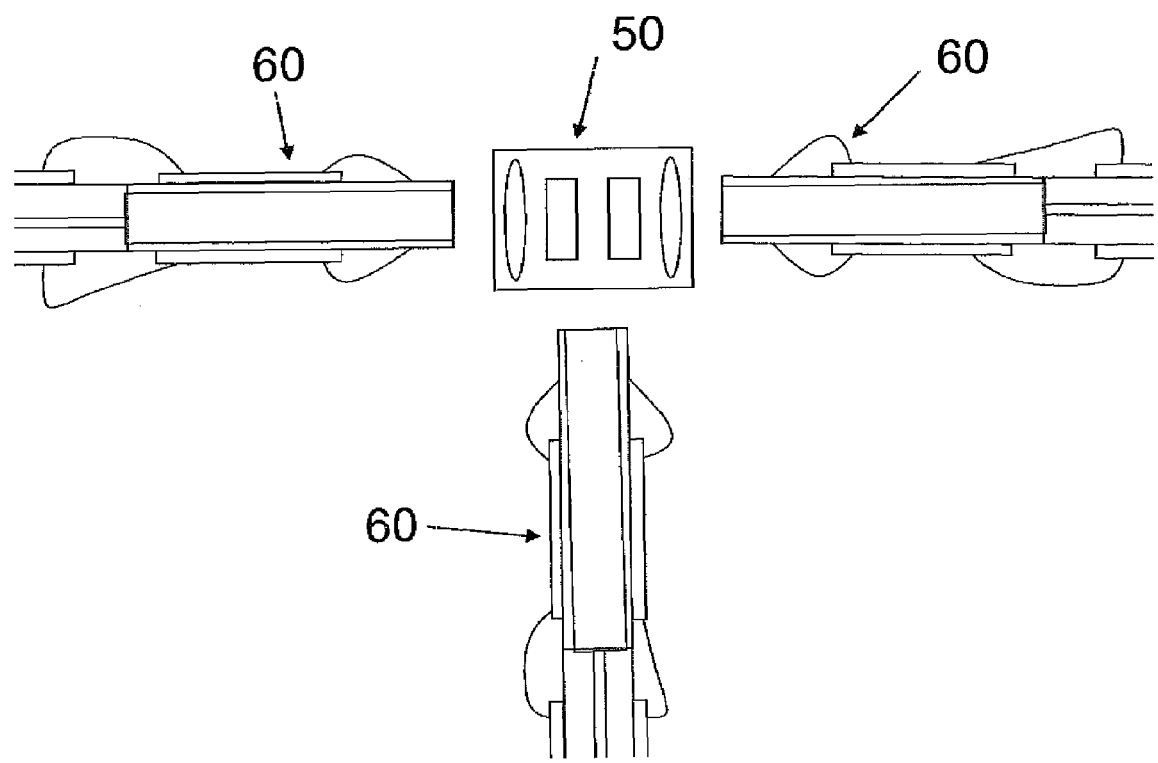

FIG. 6 illustrates the application of the disclosed high power system. In particular, the illustrated system may include a plurality of receiving components 60 each configured with either a GRIN or multiclad fiber coupler and a delivery fiber. This system is particularly advantages with the light from the light source (not shown) distributed among multiple receiving components. Such a configuration may include, for example, a circulator or any other light distributing bulk optics component. Also, receiving components may have more than one coupler and one delivery fiber. In other words, multiple fiber receiving components each configured in accordance with the receiving component of FIG. 2 or FIG. 4 can be aligned with and coupled to one another.

Although shown and described is what is believed to be the most practical and preferred embodiments, it is apparent that departures from specific configurations described and shown will suggest themselves to those skilled in the fiber laser art and may be used without departing from the spirit and scope of the invention. The disclosed system can be configured as an oscillator or amplifier. The present invention is not restricted to the particular constructions described and illustrated, but should be construed to cohere with all modifications that may fall within the scope of the appended claims.

The invention claimed is:

1. A waveguide, comprising:
 a coupler receiving high power light propagating through free space, the coupler having concentrically positioned core, at least one cladding and outer protective coating;
 a delivery fiber having a core, cladding and outer protective coating concentric with one another, the cores and claddings of the respective coupler and delivery fiber having opposing ends spliced to one another while the coatings thereof being spaced apart; and
 a light stripper extending between the protective coatings of the delivery fiber and coupler, respectively, and operative to distributively remove a portion of radiation from the cladding of the respective coupler and delivery fiber before the portion of radiation reaches the protective coating of the delivery fiber.

2. The waveguide of claim 1, wherein the coupler includes a GRIN fiber, the core of the GRIN fiber being multimode and configured to support a fundamental mode of the received radiation without substantial coupling to higher order modes, the delivery fiber being selected from the group consisting of single mode fiber and multimode fiber.

3. The waveguide of claim 1, wherein the coupler includes a multiclad fiber configured with a single- or multimode core and an inner cladding, the at least one cladding being an outer cladding extending between the inner cladding and protective coating, the delivery fiber being selected from the group consisting of a single mode fiber and multimode fiber, the core of the multiclad fiber being multimode but configured to support a fundamental mode without substantial coupling to higher order modes.

4. The waveguide of claim 1, wherein the light stripper includes material with a refractive index selected so that the refractive index of the material self-regulates removal of radiation from the claddings of the delivery fiber and coupler, respectively.

5. The waveguide of claim 4, wherein the refractive index of the light stripper substantially matches or greater than the refractive index of the claddings of the respective coupler and delivery fiber.

6. The waveguide of claim 4, wherein the refractive index is greater than that one of the claddings of the respective coupler and delivery fibers and configured to vary along a length of the light stripper.

7. The waveguide of claim 4, wherein the material of the light stripper has a negative thermal coefficient selected so as to cause the refractive index of the material to decrease below the index of refraction of the claddings of the respective delivery fiber and coupler upon reaching a predetermined temperature of the material.

8. The waveguide of claim 4, wherein the material of the light stripper is configured with the refractive index which rises in response to an increasing temperature.

9. The waveguide of claim 1, wherein the light stripper couples the spliced together coupler and delivery fiber to a mount.

10. The waveguide of claim 1 further comprising a light reflector fixed to the coupler at a distance from the light stripper and extending over a protective coating of the coupler, the light reflector having a refractive index lower than a refractive index of the at least one cladding of the coupler so as to prevent the radiation from decoupling out of the coupler.

11. The waveguide of claim 10, wherein the protective coating of the coupler extends beyond an upstream end of the coupler or terminates downstream therefrom.

12. A high power optical system, comprising:
 a source of high power radiation propagating in free space along a light path, and
 at least one light receiving unit spaced downstream from the source and receiving the radiation, the light receiving unit being configured with:
  a coupler receiving the high power radiation and having concentric core, at least one cladding and outer protective coating;
 a delivery fiber having concentrically extending core, cladding and outer protective coating, the cores and claddings of the respective coupler and delivery fiber being spliced to one another, the protective coatings of the respective coupler and delivery fiber being spaced from one another; and
 a light stripper extending between the protective coatings of the delivery fiber and coupler, respectively, and operative to distributively remove a portion of radiation from the cladding of the respective coupler and delivery fiber before the portion of radiation reaches the protective coating of the delivery fiber.

13. The high power system of claim 12, wherein the light stripper includes material with a refractive index selected so as to substantially match or exceed the refractive index of the claddings of the respective coupler and delivery fiber.

14. The high power system of claim 13, wherein the refractive index of the material of the light stripper is greater than that one of the claddings of the respective coupler and delivery fibers and configured to vary along a length of the light stripper.

15. The high power system of claim 12 further comprising a light reflector fixed to the coupler at a distance from the light stripper and extending over the protective coating of the coupler, the light reflector having a refractive index lower than a refractive index of the at least one cladding of the coupler so as to prevent the radiation received over free space from decoupling out of the coupler.

16. The high power system of claim 12, wherein the coupler includes a GRIN fiber, the core of the GRIN fiber being multimode and configured to support a fundamental mode of the received radiation without substantial coupling to higher order modes, the delivery fiber being selected from the group consisting of single mode fiber and multimode fiber.

17. The high power system of claim 12, wherein the coupler includes a multiclad fiber configured with a single- or multimode core and an inner cladding, the at least one cladding being an outer cladding extending between the inner cladding and protective coating, the delivery fiber being selected from the group consisting of a single mode fiber and multimode fiber.

18. The high power system of claim 12 further comprising a plurality of couplers, a light distributing component spaced from the plurality of couplers and a source of radiation, the light distributing component being operative to selectively couple the radiation into the plurality of the couplers.

19. A high power optical system, comprising:
   a launching component operative to radiate a beam along a path; and
   a fiber receiving component separated from the launching component by free space, the fiber receiving component being configured with a GRIN fiber and a delivery fiber spliced to a downstream end of the GRIN fiber, wherein the GRIN fiber is configured to shape the beam with a waist so that the beam couples into the upstream end of a core of the GRIN fiber without use of a bulk optics component; and
   a light stripper extending between protective coatings of the delivery fiber and coupler, respectively, the light stripper being operative to distributively remove a portion of the coupled beam from claddings of the respective coupler and delivery fiber before the portion of radiation reaches the protective coating of the delivery fiber.

20. The high power optical system, wherein the light stripper is configured with an index of refraction which is greater than an index of refraction of the cladding of the delivery fiber.

* * * * *